United States Patent
Dean et al.

(10) Patent No.: US 9,714,594 B1
(45) Date of Patent: Jul. 25, 2017

(54) CONTROL OF HYDROCARBON INJECTION RATE IN AN EXHAUST GAS ASSEMBLY

(71) Applicant: GM GLOBAL TECHNOLOGY OPERATIONS LLC, Detroit, MI (US)

(72) Inventors: Charles E. Dean, Clarkston, MI (US); Andrea Hidalgo, Clawson, MI (US); Michelangelo Ardanese, Berkley, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/002,813

(22) Filed: Jan. 21, 2016

(51) Int. Cl.
| | |
|---|---|
| *F01N 3/00* | (2006.01) |
| *F01N 3/20* | (2006.01) |
| *F01N 3/10* | (2006.01) |
| *F01N 3/035* | (2006.01) |
| *F01N 9/00* | (2006.01) |
| *F01N 11/00* | (2006.01) |
| *B01D 53/96* | (2006.01) |

(52) U.S. Cl.
CPC ......... *F01N 3/2033* (2013.01); *B01D 53/965* (2013.01); *F01N 3/035* (2013.01); *F01N 3/103* (2013.01); *F01N 9/002* (2013.01); *F01N 11/002* (2013.01); *F01N 2390/02* (2013.01); *F01N 2610/03* (2013.01); *F01N 2900/1404* (2013.01); *F01N 2900/1602* (2013.01)

(58) Field of Classification Search
CPC ........ F01N 3/2033; F01N 3/103; F01N 3/035; F01N 9/002

USPC ........................................................... 60/274
See application file for complete search history.

(56) References Cited

U.S. PATENT DOCUMENTS

| | | | | |
|---|---|---|---|---|
| 7,418,816 | B2 * | 9/2008 | Upadhyay | F01N 3/208 60/274 |
| 8,006,481 | B2 * | 8/2011 | Schmieg | F01N 3/208 60/274 |
| 8,109,081 | B2 * | 2/2012 | Perry | B01F 3/04049 60/274 |
| 2004/0221571 | A1 * | 11/2004 | Lewis, Jr. | F01N 3/0807 60/277 |
| 2008/0066455 | A1 * | 3/2008 | Viola | F01N 3/208 60/286 |
| 2009/0158719 | A1 * | 6/2009 | Hallstrom | B01D 53/9477 60/297 |

(Continued)

*Primary Examiner* — Jason Shanske
(74) *Attorney, Agent, or Firm* — Quinn IP Law

(57) ABSTRACT

An exhaust gas assembly includes an exhaust gas tube configured to receive an exhaust gas from the internal combustion engine, which includes at least one cylinder. An oxidation catalytic device may be operatively connected to the exhaust gas tube and includes a catalyst. A first temperature sensor is operatively connected to the oxidation catalytic device. A controller is operatively connected to the first temperature sensor. A hydrocarbon injector is operatively connected to the controller and configured to selectively inject an amount of hydrocarbon at a hydrocarbon injection rate. The controller includes a processor and tangible, non-transitory memory on which is recorded instructions for executing a method of controlling the hydrocarbon injection rate. The controller may be programmed to limit the hydrocarbon injection rate based at least partially on a combination of space velocity, temperature of the catalyst in the oxidation catalytic device and temperature of a particulate filter.

14 Claims, 1 Drawing Sheet

(56) References Cited

U.S. PATENT DOCUMENTS

| | | | | |
|---|---|---|---|---|
| 2010/0024389 | A1* | 2/2010 | Gady | B01D 53/30 60/274 |
| 2012/0180456 | A1* | 7/2012 | Yamada | B60W 10/30 60/274 |
| 2013/0186063 | A1* | 7/2013 | Douglas | F01N 9/002 60/274 |
| 2013/0186072 | A1* | 7/2013 | Fontana | F01N 3/0253 60/274 |
| 2014/0311128 | A1* | 10/2014 | Dingle | F01N 3/021 60/274 |
| 2014/0341781 | A1* | 11/2014 | Nagaoka | F02D 41/029 422/111 |

* cited by examiner

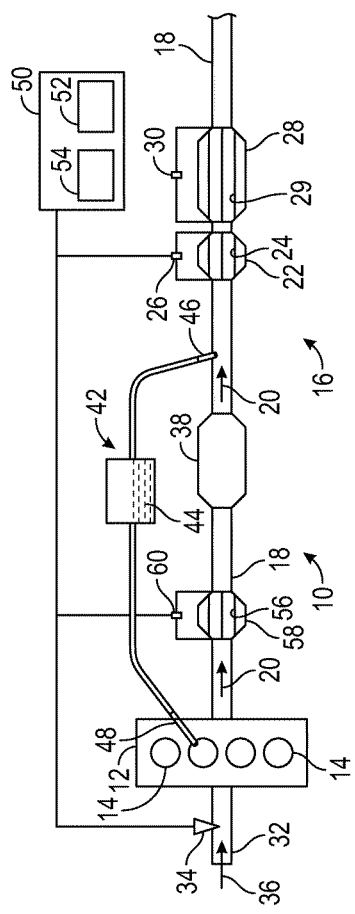
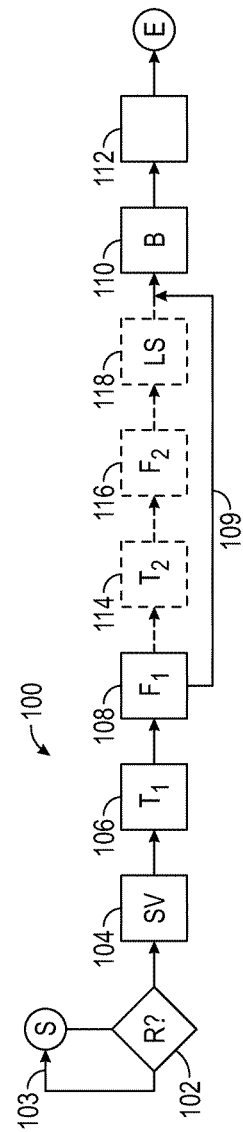
FIG. 1
FIG. 2

CONTROL OF HYDROCARBON INJECTION RATE IN AN EXHAUST GAS ASSEMBLY

TECHNICAL FIELD

The disclosure relates to control of a hydrocarbon injection rate in an exhaust gas assembly.

BACKGROUND

Hydrocarbons may be injected into internal combustion engines as fuel, in order to generate power through the combustion process. Additionally, hydrocarbons may be injected into an exhaust gas assembly in order to generate heat for various devices in the exhaust gas assembly. The injected hydrocarbons may interact with components in the exhaust gas to produce heat via an exothermic reaction. Determining the optimal rate of hydrocarbon injection requires balancing multiple factors.

SUMMARY

An exhaust gas assembly includes an exhaust gas tube configured to receive an exhaust gas from an internal combustion engine. The internal combustion engine includes at least one cylinder. An oxidation catalytic device may be operatively connected to the exhaust gas tube and includes a catalyst. A first temperature sensor is operatively connected to the oxidation catalytic device. A controller is operatively connected to the first temperature sensor. A hydrocarbon injector is operatively connected to the controller and configured to selectively inject an amount of hydrocarbon at a hydrocarbon injection rate. The hydrocarbon injector may be in fluid communication with the exhaust gas tube such that the amount of hydrocarbon is released into the exhaust gas tube. The hydrocarbon injector may be in fluid communication with the internal combustion engine such that the amount of hydrocarbon is released into at least one cylinder of the internal combustion engine.

The controller includes a processor and tangible, non-transitory memory on which is recorded instructions for executing a method of controlling the hydrocarbon injection rate. Execution of the instructions by the processor causes the controller to determine a space velocity for the exhaust gas. The controller may be programmed to determine a temperature of the oxidation catalytic device based at least partially on the first temperature sensor. The controller may be programmed to determine a first correction factor ($F_1$) based on the space velocity and the temperature of the oxidation catalytic device. The controller may be programmed to control the hydrocarbon injection rate based at least partially on the first correction factor ($F_1$).

A particulate filter may be operatively connected to the exhaust gas tube. A particulate filter temperature sensor may be operatively connected to the particulate filter. The controller may be programmed to determine a temperature of the particulate filter based at least partially on the particulate filter temperature sensor. The controller may be programmed to determine a second correction factor ($F_2$) based at least partially on the temperature of the particulate filter. The controller may be programmed to control the hydrocarbon injection rate based at least partially on a limited sum of the first and second correction factors ($F_1$, $F_2$). The limited sum is defined as a sum of the first and second correction factors ($F_1$, $F_2$) limited to a maximum value of 1 and a minimum value of 0, via the controller.

The controller may be programmed to limit the hydrocarbon injection rate based at least partially on a combination of space velocity, temperature of the catalyst in the oxidation catalytic device and temperature of the particulate filter. A mass air flow sensor may be configured to sense a flow rate of intake air entering the internal combustion engine. Determining the space velocity may include obtaining an exhaust flow rate of the exhaust gas based at least partially on the mass air flow sensor and a fuel flow rate. Determining the space velocity may include obtaining a density of the exhaust gas at a predefined temperature and a predefined pressure. Determining the space velocity may include obtaining an airspace volume of the oxidation catalytic device.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic fragmentary view of an exhaust gas assembly and a controller; and FIG. 2 is a flowchart of a method stored on and executable by the controller of FIG. 1.

DETAILED DESCRIPTION

Referring to the drawings, wherein like reference numbers refer to like components, FIG. 1 schematically illustrates an exhaust gas assembly 10. The assembly 10 may be employed in a device 16, which may be a vehicle, a bicycle, a robot, farm implement, sports-related equipment or any other torque-generating device. The device 16 includes an internal combustion engine 12 having at least one cylinder 14. The internal combustion engine 12 may be any suitable engine capable of transforming fuel to mechanical power to generate torque. However, the disclosure is applicable to any type of engine. Referring to FIG. 1, an exhaust gas tube 18 is in fluid communication with and configured to receive an exhaust gas 20 from the internal combustion engine 12. An oxidation catalytic device 22 is operatively connected to the exhaust gas tube 18 and includes at least one oxidation catalyst 24. A first temperature sensor 26 is operatively connected to the oxidation catalytic device 22. The first temperature sensor 26 may include probes positioned upstream or downstream, or both upstream and downstream, of the oxidation catalytic device 22.

The oxidation catalyst 24 may be a precious metal such as palladium, platinum or aluminum oxide, or a combination of all three. The oxidation catalyst 24 may be any suitable catalyst known to those skilled in the art. The oxidation catalyst 24, when heated to a light-off temperature, interacts with and oxidizes components in the exhaust gas 20, such as unburned hydrocarbons and carbon monoxide, to form carbon dioxide and water. An example reaction is shown below:

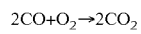

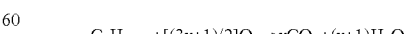

Referring to FIG. 1, a particulate filter 28 may be operatively connected to the exhaust gas tube 18 and positioned downstream of the oxidation catalytic device 22. The particulate filter 28 is configured to filter out particles or particulate matter produced by the internal combustion engine 12. These particles may include soot, hydrocarbons, ashes and sulphuric acid. On regular intervals, the particulate filter 28 has to be thermally regenerated in order to remove the accumulated particles. Referring to FIG. 1, the particulate filter 28 may include a plurality of channels 29 which are one-ended and have respective porous walls. The exhaust gas 20 travels through the porous walls of the channels, leaving particles filtered on the walls of the channels 29. The channels 29 may be composed of ceramic or any other suitable materials. The particulate filter 28 is configured to undergo thermal regeneration when the exhaust gas 20 in the particulate filter 28 is heated above a regeneration or combustion temperature, thereby allowing the particles to combust or burn. In one example, the required regeneration temperature is between 600-750° C. A particulate filter temperature sensor 30 is operatively connected to the particulate filter 28. The particulate filter temperature sensor 30 may include probes positioned upstream or downstream, or both upstream and downstream, of the particulate filter 28.

Referring to FIG. 1, the internal combustion engine 12 receives intake air 36 through an inlet 32. A mass air flow sensor 34 may be operatively connected to the inlet 32 and configured to measure the mass flow rate of the intake air 36 entering the internal combustion engine 12. The assembly 10 may include a selective catalytic converter 38 (SCR) for reducing oxides of nitrogen present in the exhaust gas 20. The selective catalytic converter 38 (SCR) may be positioned upstream or downstream of the particulate filter 28, or may share a common housing with the particulate filter 28.

Referring to FIG. 1, a controller 50 is operatively connected to various components of the assembly 10, including but not limited to, the first temperature sensor 26, the particulate filter temperature sensor 30, and other components of the assembly 10. The controller 50 is programmed to receive a hydrocarbon injection request (R) (post-combustion). A hydrocarbon injector 42 is operatively connected to the controller 50 and configured to selectively inject an amount of hydrocarbons 44 in response to the hydrocarbon injection request (R). The hydrocarbons 44 may be introduced into the flow of the exhaust gas 20 upstream of any process or device in the assembly 10. The injected hydrocarbons combust in the exhaust gas 20, generating heat that is required by various components of the assembly 10. For example, as described above, the particulate filter 28 requires heat for thermal regeneration. It is to be appreciated that the hydrocarbon injection request (R) may be for heating one or more components of the assembly 10 or for any other purpose.

Referring to FIG. 1, the hydrocarbon injector 42 may include one or both of a first injector 46 and second injector 48. The first injector 46 is in fluid communication with the exhaust gas tube 18 and configured to inject an amount of hydrocarbon that is released into the exhaust gas tube 18. The hydrocarbons 44 may be injected into the cylinder 14 of the internal combustion engine 12, after combustion occurs, through the second injector 48. Stated differently, the second injector 48 is in fluid communication with the internal combustion engine 12 and configured to inject an amount of hydrocarbon that is released into the cylinder 14.

The optimal rate of hydrocarbon injection is sensitive to multiple factors. Too low an injection rate results in insufficient heat generated and too high an injection rate results in undesired hydrocarbon slip to the tail pipe and excessive heat generation. The controller 50 includes at least one processor 52 and at least one memory 54 (or any non-transitory, tangible computer readable storage medium) on which are recorded instructions for executing method 100, shown in FIG. 2, of controlling the hydrocarbon injection rate. The controller 50 of FIG. 1 is specifically programmed to execute the steps of the method 100. The memory 54 can store controller 50—executable instruction sets, and the processor 52 can execute the controller 50—executable instruction sets stored in the memory 54. The method 100 improves the functioning of the assembly 10 (and therefore the device 16, such as a vehicle) by allowing for optimal heat generation in the assembly, while reducing hydrocarbon slip past the exhaust gas tube 18 that may result in various undesirable effects.

Referring now to FIG. 2, a flowchart of the method 100 stored on and executable by the controller 50 of FIG. 1 is shown. The start and end are indicated by "S" and "E", respectively. Method 100 need not be applied in the specific order recited herein. Furthermore, it is to be understood that some steps in method 100 may be eliminated. Referring to FIG. 2, method 100 may begin with block 102, where the controller 50 is programmed or configured to determine if a hydrocarbon injection request (indicated in block 102 as "R?") has been made. If not, the method 100 proceeds to the start, as shown by line 103. If yes, the method 100 proceeds to block 104.

In block 104 of FIG. 2, the controller 50 is programmed to determine a space velocity (SV) of the exhaust gas 20. Block 104 may include obtaining an exhaust flow rate (with units of mass per time) of the exhaust gas 20. The exhaust flow rate is the sum of the mass air flow rate (detected by the intake mass air flow sensor 34 of FIG. 1) and the fuel rate (pre-combustion) injected into the cylinder 14. Block 104 may include obtaining a density (in units mass per volume) of the exhaust gas 20 at a predefined temperature and a predefined pressure. For example, the predefined temperature and a predefined pressure may be the standard temperature 0° C. and standard pressure, 1 bar. Block 104 may include obtaining an airspace volume of the oxidation catalytic device 22, i.e. the volume of the airspace available for interaction in the oxidation catalytic device 22. The density and airspace volume may be obtained under test conditions. The space velocity (SV) of the exhaust gas 20, in inverse time units, is defined as:

$$\text{Space Velocity} = \frac{\text{Exhaust Flow Rate}}{\text{Density of Exhaust Gas} * \text{Airspace Volume}},$$

where Exhaust Flow Rate = Air Flow Rate + Total Fuel Flow Rate

In block 106 of FIG. 2, the controller 50 is programmed to determine the temperature ($T_1$) of the oxidation catalytic device 22 based at least partially on the first temperature sensor 26. The first temperature sensor 26 may include probes positioned upstream or downstream, or both upstream and downstream, of the oxidation catalytic device 22. The temperature ($T_1$) may be an average of multiple readings taken at multiple times and relative positions (upstream/downstream) of the oxidation catalytic device 22.

In block 108 of FIG. 2, the controller 50 is programmed to determine a first correction factor ($F_1$) based on the space velocity (SV), the temperature ($T_1$) of the oxidation catalytic device 22 and a first look-up repository. The look-up repository may be a chart, table, graph or any other type data store. The first correction factor ($F_1$) is, in part, a measure of the conversion efficiency or capability of the oxidation catalyst 24 in converting the injected hydrocarbon. Referring to Table 1 below, an example first look-up repository is shown. It is understood that the values shown in Table 2 are intended to be non-limiting examples. The top or first row lists space velocity (SV) values in inverse hour units, ranging from 10,000 to 45,000. The first column lists temperature ($T_1$) values in degrees Celsius, from 100 to 250. Referring to Table 1, a space velocity (SV) of approximately 30,000 inverse hours and a temperature ($T_1$) of 180° C. corresponds to a first correction factor ($F_1$) value of 0.80 (in bold).

TABLE 1

| $T_1$/SV | 10000 | 15000 | 20000 | 25000 | 30000 | 35000 | 40000 | 45000 |
|---|---|---|---|---|---|---|---|---|
| 100 | 0.00 | 0.00 | 0.00 | 0.00 | 0.00 | 0.00 | 0.00 | 0.00 |
| 150 | 0.00 | 0.00 | 0.00 | 0.00 | 0.00 | 0.00 | 0.00 | 0.00 |
| 180 | 0.97 | 0.93 | 0.88 | 0.84 | 0.80 | 0.76 | 0.72 | 0.69 |
| 200 | 1.00 | 1.00 | 1.00 | 1.00 | 0.95 | 0.90 | 0.86 | 0.81 |
| 220 | 1.00 | 1.00 | 1.00 | 1.00 | 0.98 | 0.93 | 0.88 | 0.84 |
| 250 | 1.00 | 1.00 | 1.00 | 1.00 | 0.99 | 0.94 | 0.89 | 0.85 |

In a first embodiment, the method 100 proceeds from block 108 to block 110, as indicated by line 109. In block 110 of FIG. 2, the controller 50 is programmed to determine a base injection rate (B). The base injection rate (B) may be calibrated for each assembly 10 or calculated using any method known to those skilled in the art. The base injection rate (B) may be determined using a separate algorithm not included here that is intended to estimate the amount of fuel injection required to bring the exhaust system to a desired temperature.

In block 112 of FIG. 2, the controller 50 is programmed to control the hydrocarbon injection rate based at least partially on the first correction factor ($F_1$). In the first embodiment, the controller 50 is programmed to direct the hydrocarbon injector 42 to inject at a corrected injection rate, which is the base injection rate (B) multiplied by the first correction factor ($F_1$) such that: Corrected Injection Rate=($F_1$*B).

In a second embodiment, additional blocks 114, 116 and 118 may be included, and the method 100 proceeds from block 108 to block 114. In block 114 of FIG. 2, the controller 50 is programmed to determine the temperature ($T_2$) of the particulate filter 28 based at least partially on the particulate filter temperature sensor 30. The particulate filter temperature sensor 30 may include probes positioned upstream or downstream, or both upstream and downstream, of the particulate filter 28. The temperature ($T_2$) may be an average of multiple readings taken at multiple times and relative positions (upstream/downstream) of the particulate filter 28.

In block 116 of FIG. 2, the controller 50 is programmed to determine a second correction factor ($F_2$) based on the temperature ($T_2$) of the particulate filter 28 and a second look-up repository. The look-up repository may be a chart, table, graph or any other type data store. Referring to Table 2 below, an example second look-up repository is shown. The top or first row lists temperature ($T_2$) values of the particulate filter 28 in Celsius, from 100 to 350. It is understood that the values shown in Table 2 are intended to be non-limiting examples. Referring to Table 2 below, a temperature ($T_2$) of the particulate filter of 220° C. corresponds to a second correction factor ($F_2$) value of 0.10 (in bold).

TABLE 2

| $T_2$ | 100 | 150 | 180 | 200 | 220 | 250 | 300 | 350 |
|---|---|---|---|---|---|---|---|---|
| $F_2$ | −1.00 | −1.00 | −0.50 | 0.10 | 0.10 | 0.10 | 0.10 | 0.10 |

In block 116 of FIG. 2, the controller 50 is programmed to obtain a limited sum ("LS") of the first and second correction factors ($F_1$, $F_2$). The limited sum (LS) is defined as a sum ($F_1+F_2$) of the first and second correction factors that is limited to a maximum value of 1 and a minimum value of 0. Thus, if the sum is above 1, the limited sum is 1. If the sum is below 0, the limited sum is limited to 0.

In the second embodiment, the method 100 proceeds from block 116 to block 112, in which the controller 50 is programmed to control the hydrocarbon injection rate. In the second embodiment, the controller 50 is programmed to direct the hydrocarbon injector 42 to inject at a corrected injection rate, which is the base injection rate (B) multiplied by the limited sum (LS) such that: Corrected Injection Rate=(LS*B).

A numerical example is presented for illustrative purposes and is not intended to be limiting. In this example, the exhaust flow rate is 52.3 kg/hr, and the density of the exhaust gas 20 is 1.16 kg/m$^3$ (at the standard temperature 0° C. and standard pressure 1 bar). The airspace volume of the oxidation catalytic device 22 is 0.0015 m$^3$ (1.5 liters). The space velocity (in units of inverse hour or hr$^{-1}$) is determined to be:

$$\text{Space Velocity} = \frac{52.3}{1.16 * 0.0015} = 30,0057$$

Referring to Table 1, a space velocity (SV) of approximately 30,000 inverse hours and assuming a temperature ($T_1$) of 180° C. leads to a first correction factor ($F_1$) value of 0.80 (in bold). In the first embodiment, with a first correction factor ($F_1$) value of 0.80, a hydrocarbon injection (post-combustion) would be allowed and the base injection rate (B) would be adjusted by a factor of 0.80.

In the second embodiment, with a first correction factor ($F_1$) value of 0.80, the temperature ($T_2$) of the particulate filter 28 would be determined. If the temperature ($T_2$) of the particulate filter 28 is found to be 200° C., the second correction factor ($F_2$) value would be 0.10, according to Table 2. In this case, the sum of ($F_1+F_2$) and the limited sum (LS) is 0.90. In this case, the hydrocarbon injection (post-combustion) would be allowed and the base injection rate (B) would be adjusted by a factor of 0.90.

In the second embodiment, if the temperature ($T_2$) of the particulate filter 28 is found to be 150° C., the second correction factor ($F_2$) value would be −1.00, according to Table 2. Here, assuming the first correction factor ($F_1$) is 0.8 as described above, the sum of ($F_1+F_2$) is a negative value (0.80−1.00=−0.20). Thus, the limited sum (LS) is zero. In this case, the hydrocarbon injection (post-combustion) would not be allowed because the particulate filter 28 is not sufficiently hot to convert the hydrocarbons that slip past the oxidation catalytic device 22.

The assembly 10 may include multiple oxidation catalytic devices positioned upstream or downstream of the oxidation catalytic device 22. Each oxidation catalytic device in the assembly 10 would include an independent hydrocarbon limitation calibration. For example, referring to FIG. 1, a supplemental oxidation catalytic device 58 may be operatively connected to the exhaust gas tube 18 and positioned upstream of the oxidation catalytic device 22. The supplemental oxidation catalytic device 58 includes a supplemental catalyst 56. A supplemental temperature sensor 60 may be operatively connected to the supplemental oxidation catalytic device 58. The controller 50 may be programmed to determine an independent correction factor for the supplemental oxidation catalytic device 58, based at least partially on the reading of the supplemental temperature sensor 60 and the first look-up repository (an example of which is shown in Table 1).

The controller 50 of FIG. 1 may be an integral portion of, or a separate module operatively connected to, other controllers of the device 16. The device 16 may take many different forms and include multiple and/or alternate components and facilities. The controller 50 includes a computer-readable medium (also referred to as a processor-readable medium), including any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise an assembly bus coupled to a processor of a computer. Some forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Look-up tables, databases, data repositories or other data stores described herein may include various kinds of mechanisms for storing, accessing, and retrieving various kinds of data, including a hierarchical database, a set of files in a file assembly, an application database in a proprietary format, a relational database management assembly (RDBMS), etc. Each such data store may be included within a computing device employing a computer operating assembly such as one of those mentioned above, and may be accessed via a network in any one or more of a variety of manners. A file assembly may be accessible from a computer operating assembly, and may include files stored in various formats. An RDBMS may employ the Structured Query Language (SQL) in addition to a language for creating, storing, editing, and executing stored procedures, such as the PL/SQL language mentioned above.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. An exhaust gas assembly comprising:
   an exhaust gas tube configured to receive an exhaust gas;
   an oxidation catalytic device operatively connected to the exhaust gas tube and including a catalyst;
   a first temperature sensor operatively connected to the oxidation catalytic device;
   a controller operatively connected to the first temperature sensor;
   a hydrocarbon injector operatively connected to the controller and configured to selectively inject an amount of hydrocarbon at a hydrocarbon injection rate;
   a particulate filter operatively connected to the exhaust gas tube;
   a particulate filter temperature sensor operatively connected to the particulate filter;
   wherein the controller includes a processor and tangible, non-transitory memory on which is recorded instructions for executing a method of controlling the hydrocarbon injection rate, execution of the instructions by the processor causing the controller to:
      determine a space velocity for the exhaust gas;
      determine a temperature of the oxidation catalytic device based at least partially on the first temperature sensor;
      determine a first correction factor ($F_1$) based on the space velocity, the temperature of the oxidation catalytic device and a first look-up repository;
      determine a temperature of the particulate filter based at least partially on the particulate filter temperature sensor;
      determine a second correction factor ($F_2$) based on the temperature of the particulate filter and a second look-up repository; and
      control the hydrocarbon injection rate based at least partially on the first correction factor ($F_1$) and the second correction factor ($F_2$).

2. The assembly of claim 1,
   wherein the
      control of the hydrocarbon injection rate is based at least partially on a limited sum of the first and second correction factors ($F_1$, $F_2$), the limited sum being defined as a sum of the first and second correction factors ($F_1$, $F_2$) limited to a maximum value of 1 and a minimum value of 0.

3. The assembly of claim 1, wherein the hydrocarbon injector is in fluid communication with the exhaust gas tube and the amount of hydrocarbon is released into the exhaust gas tube.

4. The assembly of claim 1, further comprising:
   an internal combustion engine operatively connected to the exhaust gas tube and having at least one cylinder;
   wherein the hydrocarbon injector is in fluid communication with the internal combustion engine and the amount of hydrocarbon is released into the at least one cylinder of the internal combustion engine.

5. The assembly of claim 1, further comprising:
   an internal combustion engine operatively connected to the exhaust gas tube and having at least one cylinder;
   a mass air flow sensor operatively connected to the internal combustion engine and configured to sense a flow rate of intake air entering the internal combustion engine; and
   wherein said determining a space velocity includes obtaining an exhaust flow rate of the exhaust gas based at least partially on the mass air flow sensor and a fuel flow rate.

6. The assembly of claim 1, wherein said determining a space velocity includes obtaining a density of the exhaust gas at a predefined temperature and a predefined pressure.

7. The assembly of claim 1, wherein said determining a space velocity includes obtaining an airspace volume of the oxidation catalytic device.

8. The assembly of claim 1, further comprising:
   an internal combustion engine operatively connected to the controller;
   a mass air flow sensor operatively connected to the internal combustion engine and configured to sense a mass flow rate of intake air entering the internal combustion engine; and
   wherein said determining a space velocity includes:
      obtaining an exhaust flow rate of the exhaust gas based at least partially on the mass air flow sensor and a fuel flow rate;
      obtaining a density of the exhaust gas at a predefined temperature and a predefined pressure; and
      obtaining an airspace volume of the oxidation catalytic device.

9. A method of controlling an exhaust gas assembly, the assembly having an oxidation catalytic device, a particulate filter, particulate filter temperature sensor, a first temperature sensor, a hydrocarbon injector for selectively injecting an amount of hydrocarbon at a hydrocarbon injection rate, a controller, and an exhaust gas tube configured to receive an exhaust gas, the method comprising:
   sensing a temperature of the oxidation catalytic device via the first temperature sensor;
   determining a space velocity for the exhaust gas;
   determining a first correction factor ($F_1$) based on the space velocity, the temperature of the oxidation catalytic device and a first look-up repository, via the controller;
   sensing a particulate filter temperature of the particulate filter via a particulate filter temperature sensor;
   determining a second correction factor ($F_2$) based on the temperature of the particulate filter and a second look-up repository, via the controller; and
   controlling the hydrocarbon injection rate based at least partially on a limited sum of the first and second correction factors ($F_1$, $F_2$), the limited sum being defined as a sum of the first and second correction factors limited to a maximum value of 1 and a minimum value of 0, via the controller.

10. The method of claim 9, wherein:
   the assembly includes an intake mass air flow sensor operatively connected to the internal combustion engine; and
   said determining a space velocity includes obtaining an exhaust flow rate of the exhaust gas based at least partially on the mass air flow sensor and a fuel flow rate.

11. The method of claim 9, wherein said determining a space velocity includes:
   obtaining a density of the exhaust gas at a predefined temperature and a predefined pressure.

12. The method of claim 9, wherein said determining a space velocity includes:
   obtaining an airspace volume of the oxidation catalytic device.

13. The method of claim 9, wherein the assembly includes a mass air flow sensor and an internal combustion engine, the mass air flow sensor configured to sense a mass flow rate of intake air entering the internal combustion engine; and
   wherein said determining a space velocity includes:
      obtaining an exhaust flow rate of the exhaust gas based at least partially on the mass air flow sensor and a fuel flow rate;
      obtaining a density of the exhaust gas at a predefined temperature and a predefined pressure; and
      obtaining an airspace volume of the oxidation catalytic device.

14. An exhaust gas assembly comprising:
   an internal combustion engine having at least one cylinder;
   an exhaust gas tube configured to receive an exhaust gas from the internal combustion engine;
   an oxidation catalytic device having a catalyst;
   a particulate filter operatively connected to the exhaust gas tube;
   a particulate filter temperature sensor operatively connected to the particulate filter;
   a first temperature sensor operatively connected to the oxidation catalytic device;
   a controller operatively connected to the first temperature sensor;
   a hydrocarbon injector operatively connected to the controller and configured to selectively inject an amount of hydrocarbon at a hydrocarbon injection rate;
   wherein the controller includes a processor and tangible, non-transitory memory on which is recorded instructions for executing a method of controlling the hydrocarbon injection rate, execution of the instructions by the processor causing the controller to:
      determine a space velocity for the exhaust gas;
      determine a temperature of the oxidation catalytic device based at least partially on the first temperature sensor;
      determine a first correction factor ($F_1$) based on the space velocity, the temperature of the oxidation catalytic device and a first look-up repository;
      determine a temperature of the particulate filter based at least partially on the particulate filter temperature sensor; and
      determine a second correction factor ($F_2$) based on the temperature of the particulate filter and a second look-up repository;
      control the hydrocarbon injection rate based at least partially on a sum ($F_1+F_2$) of the first and second correction factors.

* * * * *